United States Patent
Takeda et al.

(10) Patent No.: US 6,668,157 B1
(45) Date of Patent: Dec. 23, 2003

(54) DATA SHARING EQUIPMENT FOR MOBILE STATIONS

(75) Inventors: Koji Takeda, Kawasaki (JP); Tomonori Ozaki, Kawasaki (JP); Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 626 days.

(21) Appl. No.: 09/583,180

(22) Filed: May 30, 2000

(30) Foreign Application Priority Data

May 31, 1999 (JP) .......................................... 11-152070

(51) Int. Cl.[7] ................................................ H04B 7/15
(52) U.S. Cl. .................. 455/11.1; 455/517; 455/575.9; 701/50
(58) Field of Search ............................. 455/11.1, 414, 455/517, 518, 507, 456, 457, 522, 417, 509, 575; 340/3.41, 3.1, 3.2, 825, 825.72, 825.4; 701/50, 28; 180/167, 168

(56) References Cited

U.S. PATENT DOCUMENTS 5,646,844 A * 7/1997 Gudat et al. ............. 364/449.2
5,838,562 A * 11/1998 Gudat et al. ............ 364/424.02

FOREIGN PATENT DOCUMENTS

| JP | 10222227 | 8/1998 |
|----|----------|--------|
| WO | WO9837468 | 8/1998 |
| WO | WO9845765 | 10/1998 |

* cited by examiner

Primary Examiner—Nay Maung
Assistant Examiner—Tanmay Lele
(74) Attorney, Agent, or Firm—Varndell & Varndell, PLLC

(57) ABSTRACT

Data sharing equipment for mobile stations is described, which is capable of suppressing a load upon a communication line for data communication between a monitor station and the mobile stations and reducing a standby time required for the data communication of the mobile stations. It is assumed that excavators and trucks have received all course data C1 to C3 and courses ID1 to ID3, and truck 11 has received only the course data C1, C2 and the course ID1, ID2. When an excavator moves from present course 2 to a location to adopt course 3, and when a truck arrives at a loading spot and the excavator and the truck can communicate by spread-spectrum radio communications, the excavator transmits the course ID3 as the instruction content to the truck by the spread-spectrum radio communication.

7 Claims, 15 Drawing Sheets

DATA SHARING EQUIPMENT FOR MOBILE STATIONS

BACKGROUND OF THE INVENTION

1. Field of the Invention

The present invention relates to data sharing equipment for mobile stations, which comprises a plurality of mobile stations moving along runways and a monitor station for monitoring the plurality of mobile stations, and more particularly to data sharing equipment for mobile stations for efficiently delivering data shared among the mobile stations.

2. Description of the Related Art

Equipment for sharing data among a plurality of mobile units is known described in Japanese Patent Application Laid-Open No. 4-319991. Such equipment provides an operation schedule of each mobile unit, and states of roads and traffic to a destination of the mobile unit from central control equipment to the mobile unit. Thus, the mobile bodies can be guided by such information.

But, when the central control equipment and the mobile unit communicate mutually, this equipment has to transmit a large volume of data every time data is needed, resulting in increasing a load upon a communication line.

In addition, there is also used widely a system which provides a plurality of work machines at mines and construction sites with guidance on works by means of positioning equipment such as GPS and a total station. These work machines share data, which indicates the present landform, target landform, work schedule and work progress, to proceed the work. When the number of work machines is not many, each of data may be transmitted directly from a central station to the work machines. But, when the number of work machines is increased, data must be transmitted to the plurality of work machines, and a load upon the communication line is increased accordingly, making it hard to transmit individually. And, since the data transmission is started when data is required, the work machine has to stop working while the data is transmitted and received. Thus, there is a wasted standby time.

To decrease the communication load, broadcasting may be used to transmit to all the vehicles, but since the central station does not receive any response from the receiving side, it cannot be confirmed whether the communications are completed properly or not.

Such a problem can be solved by transmitting and receiving data by a communication method which requires an acknowledgment of reception (ACK). This communication method includes point-to-point communication and multicasting.

The point-to-point communication requires the central station to communicate with each of the plurality of work machines and takes much time to do so. And, a load on the communication line is increased because the central station receives an acknowledgment of reception from the work machines.

The multicasting can transmit data from the central station to the plurality of work machines in the same way as the broadcasting, but a load upon the communication line is increased because the central station receives an acknowledgment of reception from the plurality of work machines in the same way as the point-to-point communication.

Besides, a plurality of work machines working together may have inconsistencies in data among the plurality of work machines, resulting in causing a trouble. For example, it is assumed that track A is moved along course a and loaded by loading machine B. When the next truck C is to be loaded, the operator of the loading machine B presumes that the truck C runs the same course a as the truck A did and operates the loading machine B to stand by. But, it may happen that the truck C approaches through a different course a1, and the loading machine B and the truck C may collide mutually.

In such a case, it is possible to use the multicasting so to transmit simultaneously to all the vehicles (work machines) and to separately receive an acknowledgment of reception from all the vehicles. But, a load on the communication line is increased because of the acknowledgments of reception from the plurality of vehicles.

It is also necessary to transmit data again when there is no acknowledgment of reception from a vehicle which does not need the data at all because it is far away.

Furthermore, by selectively transmitting to vehicles which may need data, an acknowledgment of reception may be received from those vehicles. But, it is hard to predict which vehicles need data, and if such prediction is not correct, there is a danger of causing an accident that such vehicle colloid each other.

SUMMARY OF THE INVENTION

Under the circumstances as described above, it is an object of the invention to provide data sharing equipment for mobile stations which suppresses a load on a communication line for data communications between a monitor station and mobile stations and to reduce a standby time required for data communications of the mobile stations.

To achieve the aforethe object, a first aspect of the invention is directed to data sharing equipment for mobile stations, comprising a plurality of mobile stations moving along runways and a monitor station for monitoring the plurality of mobile stations, wherein:

the plurality of mobile stations and the monitor station are provided with communication means for transmitting and receiving data to and from other stations;

the mobile stations are provided with storage means for storing data transmitted from other stations, and the monitor station or at least one of the plurality of mobile stations are provided with imparting means for giving identification information to predetermined data for identifying the predetermined data;

predetermined instructions are given to the mobile station with identification information given by the imparting means; and the mobile station instructed by the identification information, when data corresponding to the identification information is not stored in its storage means, transmits a demand for transmission of data corresponding to the identification information to the monitor station or other mobile station through the communication means.

A second aspect of the invention is directed to the data sharing equipment for mobile stations according to the first aspect of the invention, wherein:

the monitor station is provided with data storage means for storing data as a reference and identification information imparting means for giving identification information for identifying data to the data stored in the data storage means, and transmits the data stored in the data storage means and the identification information given to the data to the plurality of mobile stations by broadcasting;

the monitor station or any one of the plurality of mobile stations transmits predetermined instructions to other stations by the identification information; and the mobile station instructed by the identification information, when data corresponding to the instructed identification information is not stored in the own storage means, transmits a demand for transmission of data corresponding to the identification information to the monitor station or other mobile stations.

A third aspect of the invention is directed to the data sharing equipment for mobile stations according to the first aspect of the invention, wherein:

the monitor station is provided with data storage means for storing data as a reference and identification information imparting means for giving identification information for identifying data to the data stored in the data storage means, and transmits latest identification information given to latest data stored in the data storage means by the identification information imparting means to the plurality of mobile stations by periodically broadcasting through the communication means; and when the latest data corresponding to the latest identification information from the monitor station is not stored in the storage means and judges that the latest data is required, the mobile station transmits a demand for transmission of the latest data to the monitor station or other mobile stations through the communication means.

A fourth aspect of the invention is directed to the data shearing equipment for mobile stations according to the first, second or third aspect of the invention, wherein each of the plurality of mobile stations comprises first communication means for transmitting and receiving data with other mobile stations and second communication means for transmitting and receiving data with the monitor station.

A fifth aspect of the invention is directed to data sharing equipment for mobile stations, which comprises:

a plurality of unmanned mobile stations which run according to specified course data and perform predetermined works;

generation means which generates a portion or all of course data indicating a predetermined course to be run according to the progress of work by at least one unmanned mobile station among the plurality of unmanned stations;

imparting means which gives identification information for identifying course data to the course data generated by the generation means;

transmission means which transmits the course data to which identification information is given by the imparting means to the plurality of unmanned mobile stations in advance; and instruction means which instructs a predetermined course to be run by transmitting identification information corresponding to course data indicating the predetermined course to an unmanned mobile station which is to enter the predetermined course after deciding a time to enter the course or an order to enter the course.

The first to fifth aspects of the invention will be described with reference to FIG. 9.

Monitor station 20 stores course data C1 and gives course ID, e.g., ID1, to the course data C1, and also broadcasts the course data C1 and the course ID1 to respective vehicles (e.g., excavator 60, truck 10 and truck 11) by UHF (S11).

When the excavator 60 moves to a dotted line position indicated by point 60A to which the aforethe course 2 is applied, course data C2 corresponding to the course 2 is produced, and the course data C2 is transmitted to the monitor station 20. After storing the course data C2, the monitor station 20 gives course ID, e.g., ID2, to the course data C2. Since the latest course ID only is stored, the course ID is updated its stored contents to become the course ID2.

The course data C2 and the course ID2 are broadcast from the monitor station 20 to the excavator 60, the truck 10 and the truck 11 by UHF (S12).

Besides, the same processing as above is performed when the excavator 60 moves to a point (a dot-lined position indicated by 60B) to which the aforethe course 3 is applied. Specifically, for example course ID3 is given to the course data C3, the stored content of the course ID is updated to the latest course ID3, and the course data C3 and the course ID3 are broadcast to the respective vehicles (S13).

In the processing up to this point, it is assumed that the excavator 60 and the truck 10 receive all the course data C1 to C3 and the course ID1 to ID3, and the truck 11 receives the course data C1, C2 and the course ID1, ID2 only.

Here, when the excavator 60 returns from the point where the course 3 is applied to the point where the course 2 is applied, the course ID2 is transmitted to the monitor station 20 because the course data is already produced as the course data C2 and transmitted to the monitor station 20.

At this time, after recognizing that the excavator 60 has moved from the course 3 to the location where the course 2 shall be adopted, the monitor station 20 transmits the course ID2 as the instruction content to another vehicle, e.g., the truck 10 (S14).

The truck 10 having received the course ID2 judges that it already has the course ID2 and is controlled to run according to the course data C2 indicated by the course ID2.

The excavator 60 moves from the present course 2 to a position where the course 3 is adopted, the truck 11 has reached a loading spot, and the SS radio communications between the excavator 60 and the truck 11 become possible. Then, the excavator 60 transmits the course ID3 as the instruction content to the truck 11 by the SS radio communication (S15). The truck 11 judges that it does not have the instructed course ID3 and demands for the course data C3 by transmitting the course ID3 to the excavator 60 by the SS radio transmission (S16).

The truck 11 which has received the course data C3 transmitted from the excavator 60 which has responded to the demand stores the course data C3 and the course ID3 and is controlled to run according to the course data C3 (S17).

According to the first aspect of the invention, data and the identification information indicating the data are transmitted to the mobile stations, and the actual instructions are conducted by transmitting the identification information to the pertinent mobile station. Therefore, a load on the communication line can be suppressed when the instructions are given to the plurality of mobile stations. If the mobile station to be instructed does not have the instructed date, it can obtain the data from another mobile station. Therefore, a load on the monitor station and a load on the communication line between the monitor station and the mobile station can be decreased.

According to the second aspect of the invention, data is previously transmitted to the mobile stations by broadcasting and the instructions are transmitted with the identification information to the mobile stations. Therefore, the instructions required to actually execute the instruction contents can be sufficiently executed by transmitting the identification information in a small volume of data, and a load on the communication line can be suppressed.

Since a large volume of data is previously transmitted, identification information in a small amount of data only is received when the instructions are actually received. Thus, a standby time of the mobile station can be decreased.

According to the third aspect of the invention, the latest identification information is transmitted by broadcasting in order to update to the latest data, the mobile station which has judged it necessary can demand the monitor station or another mobile station for the latest data to suppress the amount of communication data and to suppress a load on the communication line.

According to the fourth aspect of the invention, the communications between mobile stations and the communications between the monitor station and the mobile station are performed by separate communication means, so that a load on the communication line between the monitor station and the mobile station can be suppressed by performing the communication of a large volume of data between the mobile stations.

According to the fifth aspect of the invention, the mobile station to be instructed is previously transmitted with a large volume of data in advance, and when it is actually instructed, it receives identification information in only a small volume of data, so that a standby time of the mobile station can be decreased.

DESCRIPTION OF THE PREFERRED EMBODIMENTS

Now, embodiments of vehicle interference preventive equipment according to the invention will be described with reference to the accompanying drawings.

Figure 1:
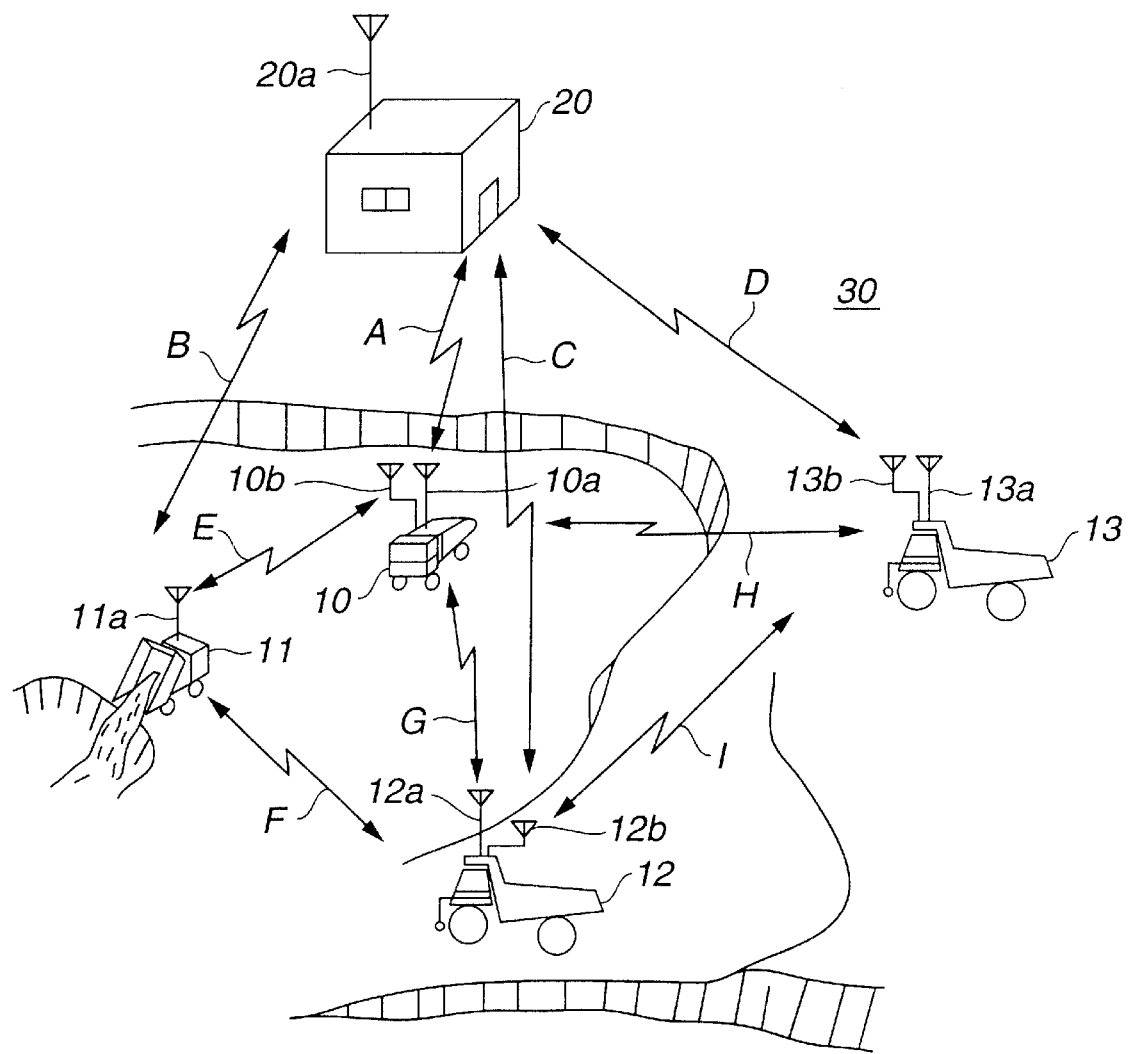
FIG. 1 is a diagram showing a general view of a vehicle monitor system which is an embodiment of vehicle interference preventive equipment according to the present invention.

FIG. 1 shows a general view of a vehicle monitor system, which controls and monitors a large number of dump trucks 10, 11, 12, 13 at a large work site 30 such as a mine which is assumed by this embodiment.

Figure 2:
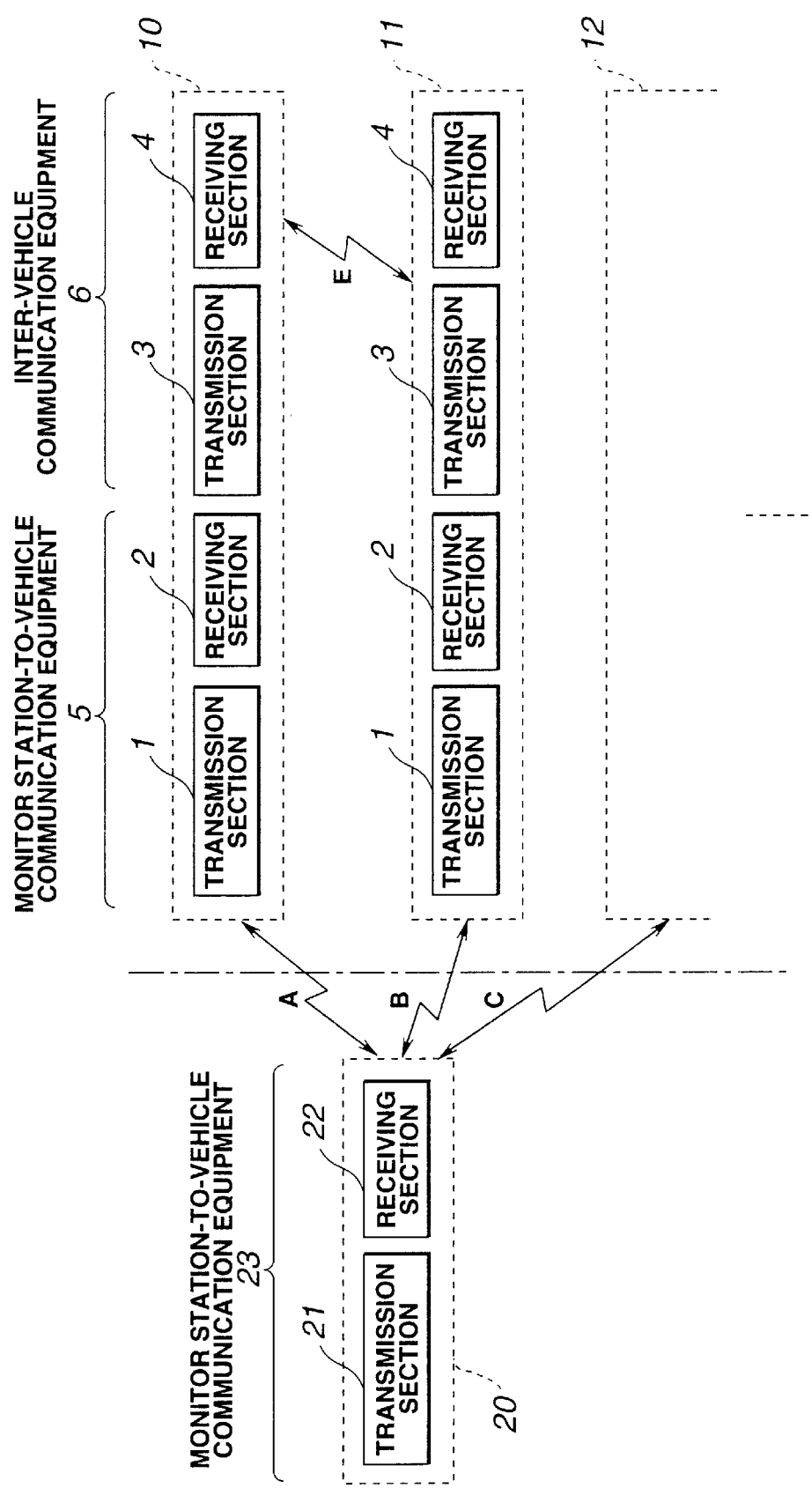
FIG. 2 is a block diagram showing a structure of the communication system of the embodiment.

FIG. 2 is a block diagram showing only a radio communication system of the vehicle monitor system.

As shown in FIG. 1, this vehicle monitor system comprises a plurality of dump trucks (hereinafter called the vehicles) 10, 11, 12, 13 having vehicle location measuring equipment to be described afterward for measuring an own vehicle location (X, Y), and monitor station 20 which receives location data (X, Y) transmitted from the plurality of vehicles, monitors the positional relations of the plurality of vehicles according to the received position data, and transmits instruction data for instructing run, stop and the like to the plurality of vehicles.

Unmanned dump trucks are mainly referred to in this embodiment, but they may be manned vehicles. And, the dump trucks are used as the vehicles, but this embodiment can also be applied to wheel loaders, hydraulic shovels and the like and can also be applied to a system which has dump trucks, wheel loaders, hydraulic shovels and the like together.

As shown in FIG. 2, the monitor station 20 and the plurality of vehicles are radio-communicated through monitor station-to-vehicle communication equipment 23, 5.

Specifically, the monitor station-to-vehicle communication equipment 23, 5, which are based on a communication method, such as an UHF method, which can make radio communications for a distance between the monitor station 20 and the plurality of vehicles, namely the entire large work site 30, are disposed on the monitor station 20 and the vehicles 10, 11, 12, 13 to send and receive the aforethe position data and instruction data between the monitor station 20 and the plurality of vehicles.

The monitor station-to-vehicle communication equipment 23 of the monitor station 20 comprises transmission section 21 and receiving section 22, and the monitor station-to-vehicle communication equipment 5 of the vehicle 10 comprises transmission section 1 and receiving section 2, to make radio communications A through antenna 20a of the monitor station 20 and antenna 10a of the vehicle 10 as shown in FIG. 1. Similarly, other vehicles are also designed to make radio communications B through the antenna 20a of the monitor station 20 and antenna 11a of the vehicle 11, radio communications C through the antenna 20a of the monitor station 20 and antenna 12a of the vehicle 12 and radio communications D through the antenna 20a of the monitor station 20 and antenna 13a of the vehicle 13.

The monitor station 20 is also provided with a GPS (Global Positioning System) receiver (not shown) for receiving a signal transmitted from an artificial satellite, calculates a measured position error according to data indicating an accurate position of the monitor station 20 as a reference point and position data measured by the GPS receiver, and sends correction data (differential data) for removing the measured position error to the each vehicle through the transmission section 21 and the antenna 20a.

The monitor station 20 is provided with a storage device (not shown) which stores course data indicating predetermined runways (courses) at a large work site such as a mine, data being transmitted from each vehicle, a program (software) for indicating a processing procedure for transmitting various types of instructions and commands to the respective vehicles, and other data required for monitoring and controlling the vehicles.

Control according to the communications by the monitor station-to-vehicle communication equipment is not directly related to the aspect of the present invention and its description will be omitted as required.

Radio communications are also made among the plurality of vehicles by vehicle-to-vehicle communication equipment 6.

Specifically, the vehicle-to-vehicle communication equipment 6, which is based on a communication method, e.g., SS radio (spread spectrum method), capable of making radio communications for a distance among the plurality of vehicles and transmitting and receiving data at a higher speed than the monitor station-to-vehicle communication equipment 23, 5, is mounted on the respective vehicles 10 to 13. Thus, various types of data such as the aforethe position data and control and instruction data to be described afterward are transmitted and received among this plurality of vehicles.

The vehicle-to-vehicle communication equipment 6 of the each vehicle comprises a transmitter 3 and receiver 4, and as shown in FIG. 1, radio communication E is made through antenna 10b of the vehicle 10 and antenna 11b of the vehicle 11, radio communication F is made through the antenna 11b of the vehicle 11 and antenna 12b of the vehicle 12, radio communication G is made through the antenna 10b of the vehicle 10 and the antenna 12b of the vehicles 12, radio communication H is made through the antenna 10b of the vehicle 10 and antenna 13b of the vehicle 13, and radio communication I is made through the antenna 12b of the vehicle 12 and the antenna 13b of the vehicle 13. When the vehicles (e.g., the vehicles 11, 13) are separated from each other by a distance longer than a distance covered by electric waves, radio communications may be disabled.

To prevent the vehicles from interfering to one another, the respective vehicles periodically communicate by UHF method to broadcast identification information for identifying the own vehicle (hereinafter called the vehicle ID) and current position data for indicating a current position of the vehicle to all the other vehicles and the monitor station and also to periodically broadcast the own vehicle ID and current position data to the nearby vehicles.

The term "broadcast" is used to indicate a transmission which does not require the acknowledgment of reception by the radio station (e.g., the vehicles). Therefore, since communications can be effected simultaneously to all the radio stations without requiring the acknowledgment of reception, a load upon the communication line is so light that a radio resource can be used effectively.

Reasons to use the UHF communications method for a long-distant communications and the SS radio method for a short-distant communications are that the UHF communication method has a small communication capacity (about 9600 bps) but can make a long-distance (10 km to 20 km) communication or can cover communications in all the area of the mine (large work site) directly or by using one to two repeaters. And the SS radio method has a short communicable distance (100 m to 1 km) but is suitable for exchanging information frequently between the vehicles.

Figure 3:
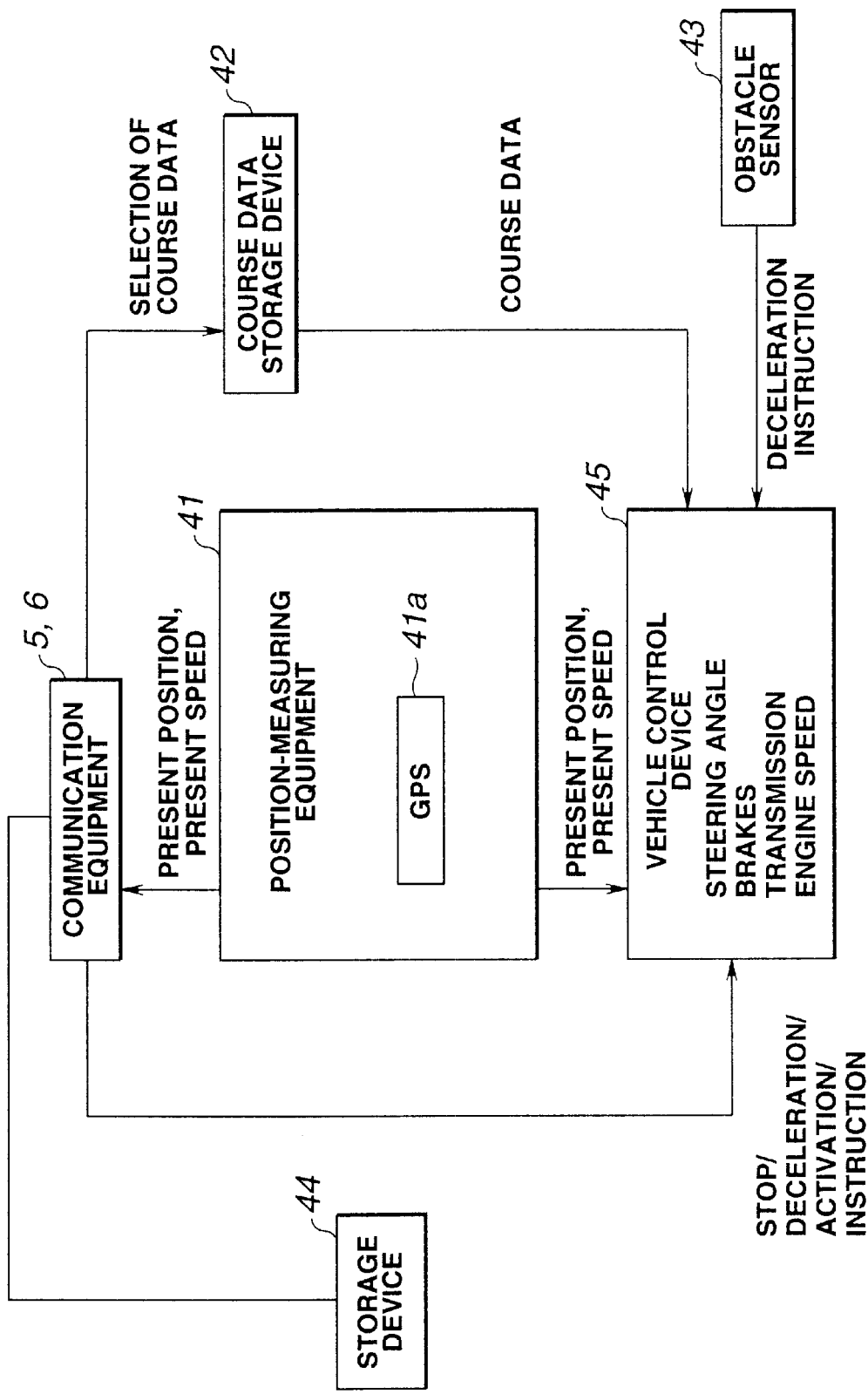
FIG. 3 is a block diagram showing a configuration of equipment and devices mounted on an unmanned vehicle.

FIG. 3 is a block diagram showing a configuration of equipment and devices mounted on an unmanned vehicle (unmanned dump truck).

As shown in FIG. 3, this unmanned vehicle mainly has a CPU (central processing unit) and comprises position measuring equipment 41 for measuring a current position of the own vehicle (e.g., the vehicle 10), the communication devices 5, 6, a course data storage means 42 for storing course data and the like indicating a predetermined runway, an obstacle sensor 43 for detecting an obstacle, a storage means 44 for storing data received through the communication device 6, and a vehicle control device 45 for controlling the drive of the own vehicle.

The position measuring equipment 41 has GPS (global positioning system) 41a which receives a signal from an artificial satellite to measure the current position of the own vehicle and outputs the measured result (the current position data) to the vehicle control device 45 and the communication devices 5, 6.

When the GPS 41a measures the position, the measured position data of the vehicle is corrected according to differential data being transmitted from the monitor station 20 to determine the accurate current position.

According to the results of the position measurement by the GPS 41a and the measurement by INS (Inertial Navigation System) for measuring the speed of the own vehicle, the position measuring equipment 41 compares predetermined course data with the measured position data in addition to the determination of the current position of the vehicle, to determine a traveling direction, position measurement accuracy, a degree of dislocation from the course (scheduled runway) and an amount of angle deviated from a specified direction of the scheduled runway.

The course data storage device 42 is previously given data indicating a scheduled runway, which is obtained by teaching of the scheduled runway conducted before the practical work.

The monitor station 20 sends instruction data, which indicates a final target point (destination), from the transmission section 21 of the monitor station-to-vehicle communication equipment 23 to the respective vehicles to start a playback operation.

The obstacle sensor 43 detects obstacles such as rocks and other vehicles present on the scheduled runway and outputs the detected result to the vehicle control device 45.

The storage device 44 stores data received through the monitor station-to-vehicle communication equipment 5, data received through the vehicle-to-vehicle communication equipment 6, position data indicating the locations of the other vehicles and data to be sent to the monitor station or the other vehicles through the communication devices 5, 6.

The vehicle control device 45 controls the steering wheel angle, the brakes, the transmission and the engine speed according to data indicating the present location and speed of the vehicle 10 measured by the position measuring equipment 41, instruction data indicating instructions such as stop, decelerate and the like received by the monitor station-to-vehicle communication equipment 5 from the monitor station 20 and the course data stored in the course data storage device 42.

Specifically, a target engine speed is determined, and an amount of fuel injected is controlled according to an electric signal given to an electronically controlled governor to change the engine speed. An engine speed sensor detects the actual engine speed, and the detected engine speed is used as a feedback signal for controlling the engine speed.

When the forward/backward clutch is in a forward or reverse state (other than neutral), the engine power is transmitted to wheels through the torque converter, transmission, propeller shaft and differential gear, and the running speed of the vehicle 10 is varied according to the change in the engine speed.

The hydraulic pump is driven by the engine, an injected pressure oil of the hydraulic pump is applied to a hydraulic actuator for driving a load-carrying platform and also supplied to a steering cylinder for driving the steering wheel through a steering hydraulic solenoid proportional valve. Thus, the steering wheel is driven to change its steering angle according to an electric signal applied to the steering hydraulic solenoid proportional valve.

A target value of a brake pressure is determined, and the brake pressure is varied according to an electric signal applied to a brake air-pressure solenoid proportional valve to operate the brakes. The brakes are provided with a brake pressure sensor for detecting a brake pressure, and the detected signal is used as a feedback signal for controlling the brake pressure.

Figure 4:
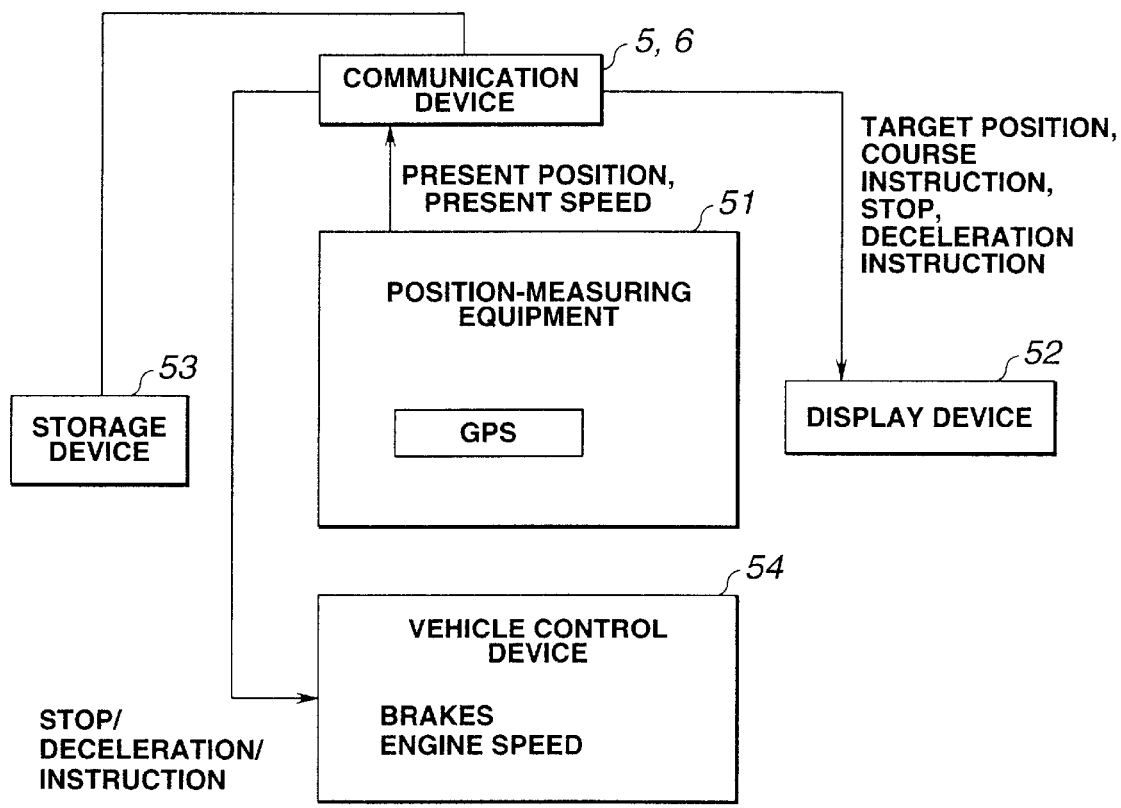
FIG. 4 is a block diagram showing a configuration of equipment and devices mounted on a manned vehicle.

FIG. 4 is a block diagram showing a configuration of equipment and devices mounted on a manned vehicle (manned dump truck).

As shown in FIG. 4, this manned vehicle mainly has CPU (central processing unit) and comprises the communication devices 5, 6, position measuring equipment 51 having the same function as the aforethe position measuring equipment 41, a display device 52, a storage device 53 having the same function as the aforethe storage device 43 and a vehicle control device 54.

The display device 52 displays the contents of instruction data, control command data and the like from the monitor station 20.

A vehicle controller 55 has the same function as the vehicle control device 45. But, the steering angle, brakes, transmission and engine speed are manually controlled by the operator, but the brakes and the engine speed are sometimes controlled automatically.

Specifically, the operator operates a console according to the contents of the instructions from the monitor station 20 indicated on the screen of the display device 52 to manually control the steering angle, brakes, transmission and engine speed.

But, when the contents of the instructions are not executed in a predetermined time from the indication of the instruction data on the display device 52, the brakes and engine speed are automatically controlled to automatically display the instruction data, and the manned vehicle is automatically decelerated, stopped or the like.

At a loading spot in a large work site (work site 30), the unmanned vehicle (damp truck) is controlled to be guided to a new loading spot as required according to new course data calculated based on the present locations of excavators and wheel loaders.

At the loading spot, a newly produced course (scheduled runway) along the movement of the excavator is applied to a dump truck first arriving at the loading spot.

But, the large work site has a plurality of soil unloading spots such as a temporary soil unloading spot and a large number of junction points of courses, and various types of work vehicles such as a sprinkler truck, a grader and the like are running along the courses. Therefore, it is hard to judge which vehicle is the first to arrive at the loading spot. It is also difficult to judge how many dump trucks are allowed to use a new course.

But, delivery (transmission) of the course data to the dump truck after its arrival at the loading sport lowers workability because the truck must wait there while the data is being delivered.

Accordingly, the monitor station 20 gives unique identification information (hereinafter called ID) to new course data produced with the movement of the excavator and also broadcasts the course data and the ID to the respective vehicles (dump trucks) via UHF. The each vehicle may acquire a plurality of pairs of data because a pair of the course data and the ID is broadcast every time new course data is produced. Instructions about a course where the truck must run are given by the monitor station 20 or another mobile station (the excavator in this case) which transmits ID corresponding to the course to the pertinent vehicle.

Thus, the each vehicle has already obtained the course data and ID before arriving at the loading spot (before entering the loading area) by sharing the course data as common data among the plurality of vehicles. If instructions are given by sending ID when the truck arrives at the loading spot, standby time can be ignored, so that the running of the truck can be controlled according to the course data. In other words, the ID is smaller than an amount of the course data, so that the time required to receive the ID is shorter than that required receiving the course data. Such time can be so short that the standby time of the vehicle can be ignored.

Now, the contents of the process will be described more specifically.

Data (course data) indicating the scheduled running route in the large work site is point sequence data indicating respective points on the scheduled runway. Each point is given data such as two-dimensional coordinate positions (X, Y) with a given point determined as the starting point in the work site, a line-of-sight distance and a vehicle speed. Each point has time required for passing from one point to another divided at an interval of, for example, one second, and the each point and its scheduled passing time t are mutually corresponded in 1 to 1.

Figure 5:
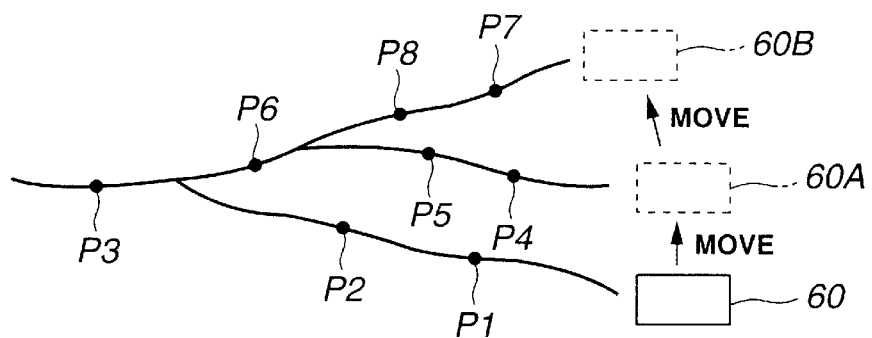
FIG. 5 is a diagram for illustrating the contents of common data.

FIG. 5 is a diagram for illustrating scheduled runways in the loading spots. FIG. 5 shows a course passing through points P1, P2, P3 (determined as course 1), a course passing through points P4, P5, P6, P3 (determined as course 2), and a course passing through points P7, P8, P6, P3 (determined course 3).

Here, course data corresponding to point sequence data indicating the respective points of the curse 1 is determined as course data C1, course data corresponding to point sequence data indicating the respective points of the curse 2 is determined as course data C2, and course data corresponding to the respective points of the course 3 is determined as course data C3.

It is assumed that when excavator 60 moves from a location where the course 1 is applied to location 60A or 60B indicated by a dotted square in the loading spot, the course 2 or 3 is applied depending on the location where the excavation 60 has moved.

Figure 6:
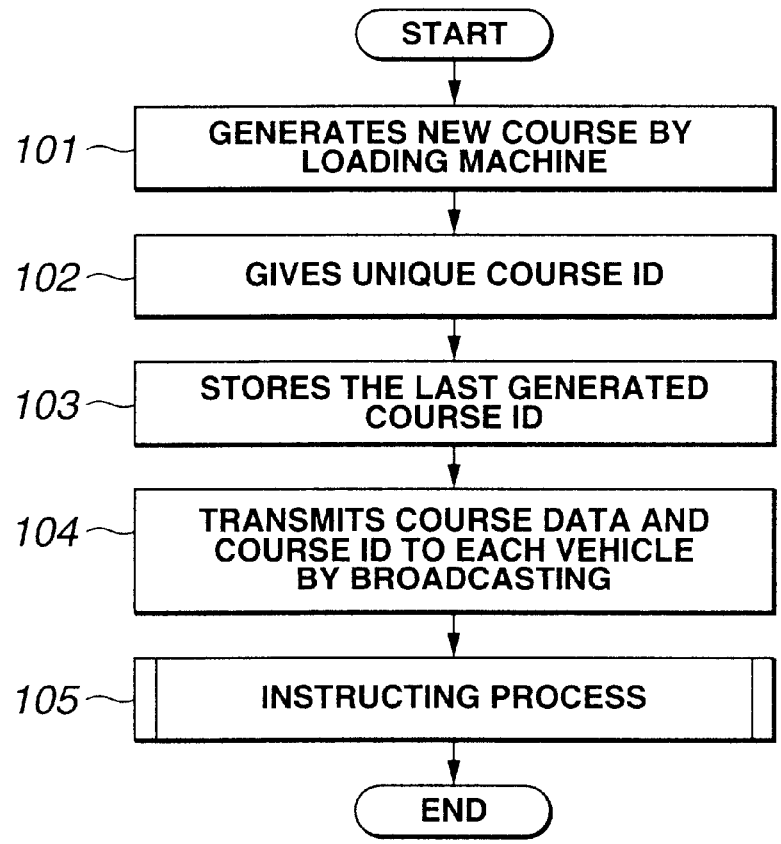
FIG. 6 is a flowchart showing a processing operation of a monitor station of the embodiment.

Now, the processing operation of the monitor station 20 in the vehicle monitor system configured as described above will be described with reference to the flowchart of FIG. 6.

When a new course, namely course data, is produced by a loader (e.g., the excavator 60), this course data is transmitted from the loader to the monitor station 20 through the monitor station-to-vehicle communication equipment 5, 23, so that the monitor station 20 receives and stores the course data transmitted from the loader (step 101).

Then, the monitor station 20 gives unique course ID to this course data (step 102), stores the finally produced course ID (step 103), broadcasts the course data and the course ID by UHF to the respective vehicles through the monitor station-to-vehicle communication equipment 5 (step 104) and executes an instructing process for instructing the vehicle (step 105).

The instructing process will be described with reference to the flowchart shown in FIG. 7.

Figure 7:
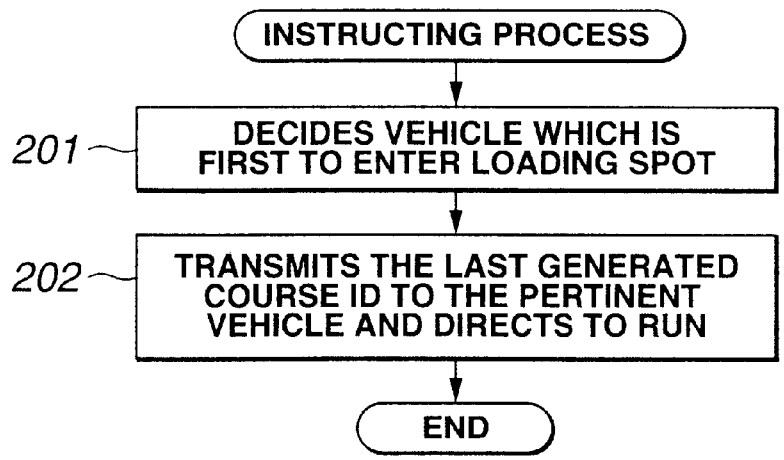
FIG. 7 is a flowchart showing a processing operation of a monitor station of the embodiment.

As shown in FIG. 7, when the vehicle which is the first to enter the loading spot is decided (step 201), the monitor station 20 sends the stored course ID (the last produced course ID) to the pertinent vehicle (the vehicle first arrived at the loading spot) to instruct it to run (step 202).

The processing contents of the vehicle will be described with reference to the flowchart shown in FIG. 8.

Figure 8:
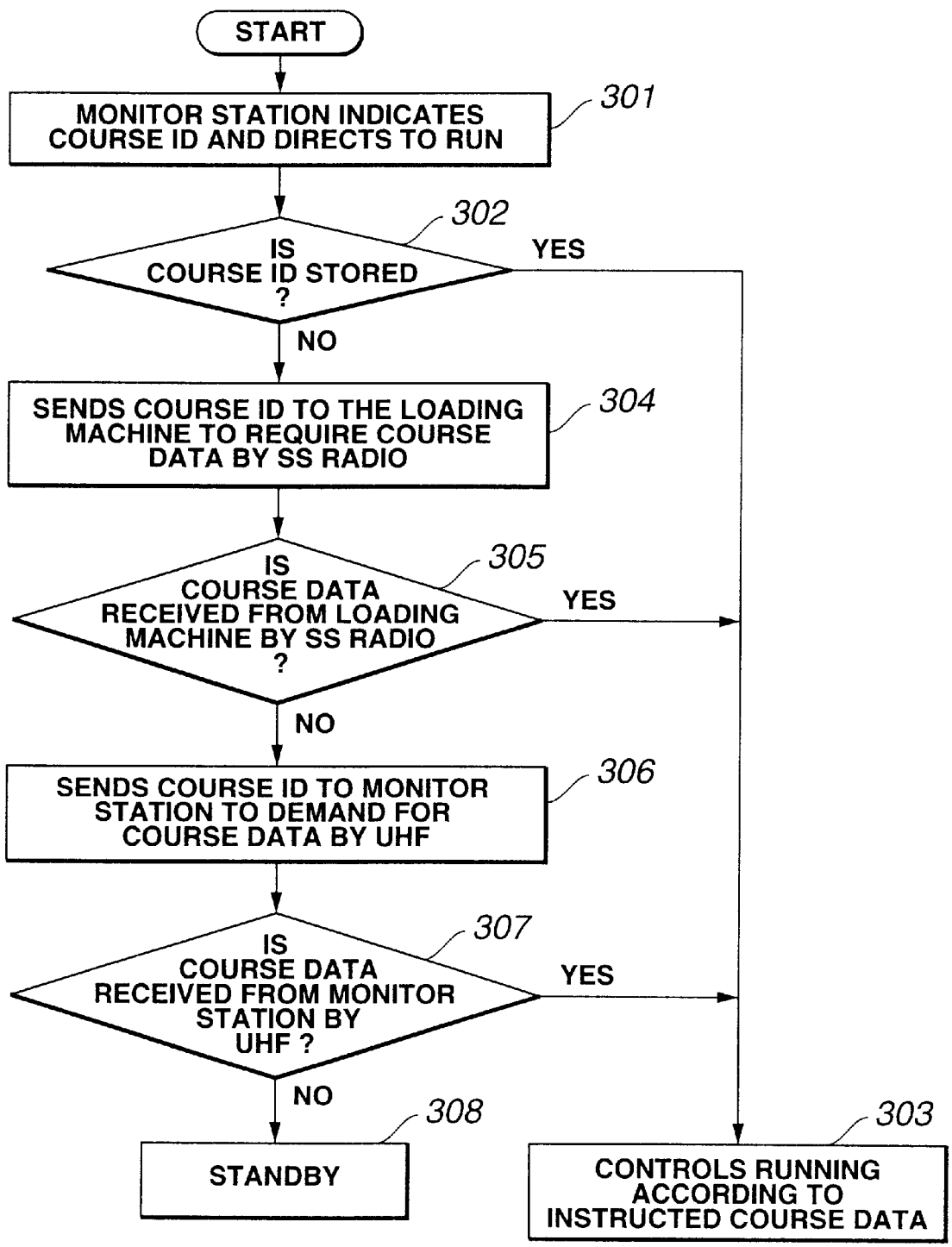
FIG. 8 is a flowchart showing a processing operation of each vehicle of the embodiment.

As shown in FIG. 8, the vehicle to be instructed is instructed a course ID to run from the monitor station 20 through the monitor station-to-vehicle communication equipment 5 (step 301), judges whether or not it already has the subject course ID (step 302), and when it does, control to run according to the instructed course data (step 303).

When the subject course ID has not been stored in step 302, the vehicle transmits the subject course ID to the loader through the vehicle-to-vehicle communication equipment 6 by the SS radio communications to demand for the course data indicated by the curse ID (step 304). Then, it is judged whether the course data has been received from the loader by the SS radio communication through the vehicle-to-vehicle communication equipment 6 (step 305).

When the course data is received in the step 305, the subject vehicle stores the received course data and course ID into the storage device 44. Then, the process goes to step 303.

When the course data is not received in the step 305, the subject vehicle transmits the instructed course ID to the monitor station 20 by UHF through the monitor station-to-vehicle communication equipment 5 to demand for course data indicated by the course ID (step 306).

And, the subject vehicle judges whether it has received the course data from the monitor station 20 by UHF through the monitor station-to-vehicle communication equipment 5 (step 307). If received, the subject vehicle stores the received course data and course ID, and the procedure goes to step 303. But, if not, the vehicle stays where it is (step 308).

The processing described with reference to FIG. 7 and FIG. 8 will be described more specifically with reference to FIG. 9.

Figure 9:
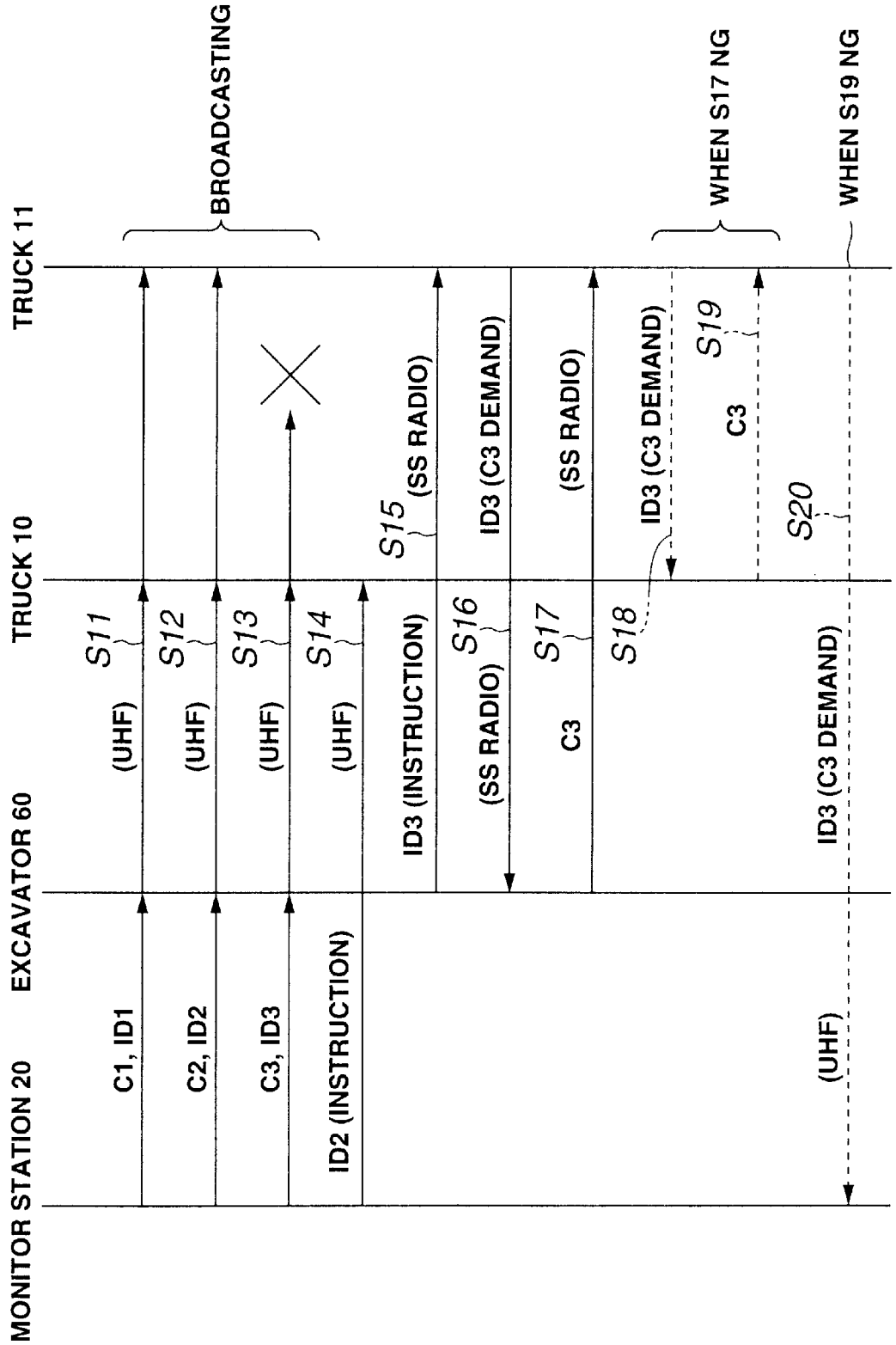
FIG. 9 is a sequence diagram showing a processing operation of a vehicle monitor system of the embodiment.

In FIG. 9, C1 to C3 mean course data C1 to C3, and ID1 to ID3 mean course ID1 to ID3.

Where the excavator 60 (loader) is positioned at a point where the aforethe course 1 is applied, the course data C1 corresponding to the course 1 is produced, and the course data C1 is transmitted to the monitor station 20.

After storing the course data C1, the monitor station 20 gives the course ID, e.g., ID1, to the course data C1, stores the course ID1 and broadcasts the course data C1 and the course ID1 to the respective vehicles (e.g., the excavator 60, the truck 10 and the truck 11) by UHF (S11).

Now, when the excavator 60 moves to the location 60A indicated by the dotted square, the course data C2 is newly generated and transmitted to the monitor station 20. After storing the course data C2, the monitor station 20 gives the course ID, e.g., ID2, to the course data C2.

The course data C2 and the course ID2 are broadcast from the monitor station 20 to the excavator 60, the truck 10 and the truck 11 by UHF (S12).

Besides, the excavator 60 moves to the location (location 60B indicated by the dotted square) where the aforethe course 3 is applied, and the same procedure as above is performed. In other words, for example, the course ID3 is given to the course data C3, and the course data C3 and the course ID3 are broadcast to the respective vehicles (S13).

In the processing up to this point, it is assumed that the excavator 60 and the truck 10 have received all the course data C1 to C3 and the course ID1 to ID3, and the truck 11 has received the course data C1, C2 and the course ID1 and ID2 only.

And, when the excavator 60 returns from the location where the course 3 is applied to the location where the course 2 is applied, the course data has been produced as the course data C2 and transmitted to the excavator 60. Therefore, the excavator 60 judges that it must run the course ID2 and transmits it to the monitor station 20.

The monitor station 20 then transmits the course ID2 as the contents of the instructions by UHF to another vehicle, e.g., the truck 10 (S14).

The truck 10 thus instructed to take the course ID2 judges that the course ID2 is stored therein and controls to run according to the course data C2 indicated by the course ID2.

Besides, the excavator 60 moves to the location of 60B, the truck 11 reaches the loading spot, and the SS radio communication becomes possible between the excavator 60 and the truck 11. Then, the excavator 60 transmits the course ID3 as the instruction contents by the SS radio communication to the truck 11 (S15), and the truck 11 judges that the instructed course ID3 is not stored therein and transmits the course ID3 to the excavator 60 by the SS radio communication to require the course data C3 (S16).

The truck 11 having received the course data C3 transmitted from the excavator 60 in response to the aforethe requirement stores the course data C3 and the course ID3 therein and controls to run according to the course data C3 (S17).

If the course data C3 is not transmitted from the excavator 60 or if the truck 11 cannot receive the transmitted course data C3, the truck 11 transmits the course ID3 to the truck 10 located near the own vehicle to demand for the course data C3 (S18). And, the truck 11 receives the course data C3 transmitted from the truck 10 (S19), stores that data and the course ID3, and controls to run according to the course data C3.

Besides, when it is assumed in S19 that the truck 10 could not receive the course data C3 in S13, the course data C3 cannot be obtained from the truck 10. Therefore, the truck 11 transmits the course ID3 to the monitor station 20 by UHF to demand for the course data C3 (S20).

Thus, when the instructed course ID is not stored, the course ID is transmitted first to the excavator, then to the neighboring vehicle and finally to the monitor station to obtain the instructed course data.

As described above, the monitor station 20 can transmit the course ID as the instruction contents by UHF, and the excavator 60 can also transmit the course ID as the instruction content by the SS radio communication.

It can be determined in advance which directs the course ID when the system is configured.

As described above, the course data is previously transmitted from the loader (e.g., the excavator 60) to the vehicle (e.g., the dump truck) by broadcasting in this embodiment, so that there is not caused a standby time for the vehicle due to the communication of the course data. And, even when a given vehicle (e.g., the dump truck 11) fails to communicate by broadcasting (e.g., a failure of receiving the course data C3), the truck 11 can receive the course data C3 from the neighboring vehicle (e.g., the dump truck 10) by the high-speed SS radio communication.

Besides, no load is applied to the communication line because the course data has been transmitted to the plurality of trucks arriving at the loading spot by broadcasting.

Second Embodiment

The same vehicle monitor system as described in the first embodiment is considered in the second embodiment. Basically, the radio communication system of this vehicle communication system has the same structure as shown in FIG. 2, the equipment and devices mounted on the unmanned vehicle have the same structure as shown in FIG. 3, and the equipment and devices mounted on the manned vehicle have the same structure as shown in FIG. 4.

In the second embodiment, data about an obstacle is adopted as common data, and it is shared among a plurality of vehicles.

Here, reasons of adopting the data about the obstacle as the common data will be described.

A large work site such as a mine has a plurality of work vehicles such as dump trucks moving around. Earth, sand and rocks loaded on the dump trucks are often dropped at corners and due to vibrations caused by rut and the like. Such rocks make obstacles on the courses, possibly damaging expensive tires of big construction vehicles and causing a serious damage to light-duty vehicles.

A driver (operator) having found any obstacle on the course reports the location of the obstacle to the monitor station 20 to call a work machine such as a wheel loader to remove the obstacle. By the time the obstacle is removed by the work machine, other vehicles must to run paying attention to the obstacle.

In this embodiment, when any vehicle (driver) finds an obstacle, the location, shape and approximate weight of the obstacle is reported from the vehicle to the monitor station 20 by UHF. The monitor station 20 having received the report selects a work machine for removing the obstacle according to its work capacity, present work contents and location and instructs its dispatch.

To identify the reported obstacle, the monitor station 20 generates new identification information (hereinafter called the ID), and periodically broadcasts the newly produced obstacle ID and data about its approximate location (e.g., shape data of the obstacle indicated in mm is indicated in unit of 10 m in terms of its center position) by UHF. (Detailed data is not broadcast.)

Being informed the occurrence of the new obstacle by the broadcast from the monitor station 20, each of the respective vehicles moving around in the large work site inquires other passing-by vehicles and other vehicles ahead and behind the pertinent vehicle about whether they have stored data about the position, shape, approximate weight and the like of the obstacle (hereinafter called the obstacle data) by the SS radio communication. And, when there is a vehicle having stored the obstacle date, the pertinent vehicle receives a copy of the obstacle data through the SS radio communication.

Generally, the obstacle data is shared in an order from the vehicles located around the vehicle first found the obstacle.

If a vehicle not having stored the details of the obstacle comes close to the obstacle, it detects that it is approaching the obstacle in view of an approximate position of the obstacle and demands the monitor station 20 for detailed data of the obstacle.

By sharing the obstacle data among the plurality of vehicles as described above, the presence of the obstacle can be recognized before the operator actually finds the obstacle, and the operator can safely operate to avoid the obstacle according to the obstacle data. The obstacle data is adopted as common data for the reasons as described above.

When the obstacle is removed by a work vehicle such as a wheel loader, it is reported from the work vehicle to the monitor station 20 that the obstacle having the aforethe ID was removed. The monitor station 20 produces a new ID and broadcasts it. For the new ID, data about the removal of the obstacle is stored.

Since the respective vehicles can know that the new ID was registered from the broadcasting about it from the monitor station 20, the each vehicle inquires another vehicle about the contents of a change corresponding to the new ID. In this case, it is informed that the obstacle was removed.

Thus, the obstacle data is either actual obstacle data or data indicating that the obstacle was removed. Therefore, the obstacle data which means data indicating the removal of the obstacle also becomes common data.

When it is repeated to add and remove an obstacle, ID is given to each of them. The number of latest IDs broadcast from the monitor station to the respective vehicles is limited. In this embodiment, only one latest ID is broadcast.

Specifically, ID has a relation between the new and the old defined, and the each vehicle can judge that its data is the latest one by receiving one ID from the monitor station 20. The respective vehicles can transmit ID mutually to judge which data is new.

For example, where power is newly turned on, it can be judged whether data stored in the own vehicle is the latest or not by receiving ID from the monitor station 20. When the data is old, the vehicle can communicate with another vehicle by the SS radio communication to receive the latest data or newer data than its own data.

In this embodiment, the invention can be applied not only to the obstacle on a course but also to a change in shape of the loading spot. Specifically, a shape of the loading spot is gradually changed by the loading machine such as an excavator working at the spot. Data indicating the changed shape due to excavation is reported from the excavator to the monitor station 20 as required and also delivered to the respective vehicles in the same way. The respective vehicles can obtain the present landform by accumulating data indicating the changed forms.

Data indicating the form of the loading spot is used as guidance to prevent the vehicles from falling from the loading spot.

And unique ID is given to data, unique update ID is given to the fact that data is updated independent of the former ID, and the update ID may be used as ID of the aforethe obstacle. In correspondence with the individual update ID, the monitor station 20 stores the ID of the corresponding obstacle data together with the update contents such as the effect of adding the obstacle, the effect of deleting it or the effect of changing its shape.

The update ID is unique and has the relation between the new and the old defined, so that the each vehicle can judge whether its data is the latest one or not by simply receiving one update ID. The update ID and the update contents are broadcast, and the vehicle having received the broadcast stores the update ID and the update contents. When the vehicle judges that the data stored therein is not the latest one in view of the broadcast of the update ID only in the later stage, the vehicle demands first the neighboring vehicle and then the monitor station 20 to transmit the update contents.

The contents of the processing by the monitor station 20 will be described with reference to FIG. 10 and FIG. 11.

Figure 10:
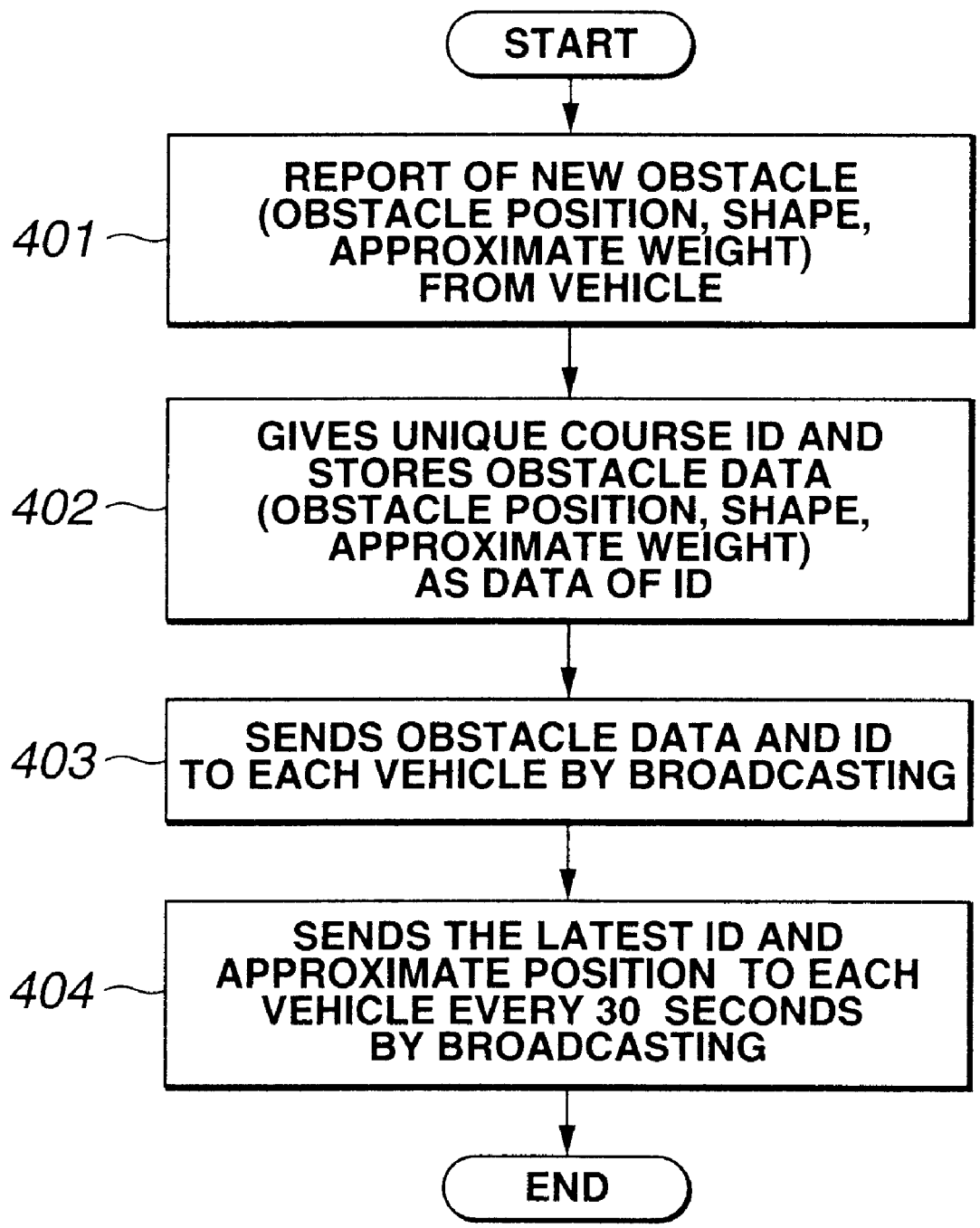
FIG. 10 is a flowchart showing a processing operation of the monitor station of a second embodiment.
Figure 11:
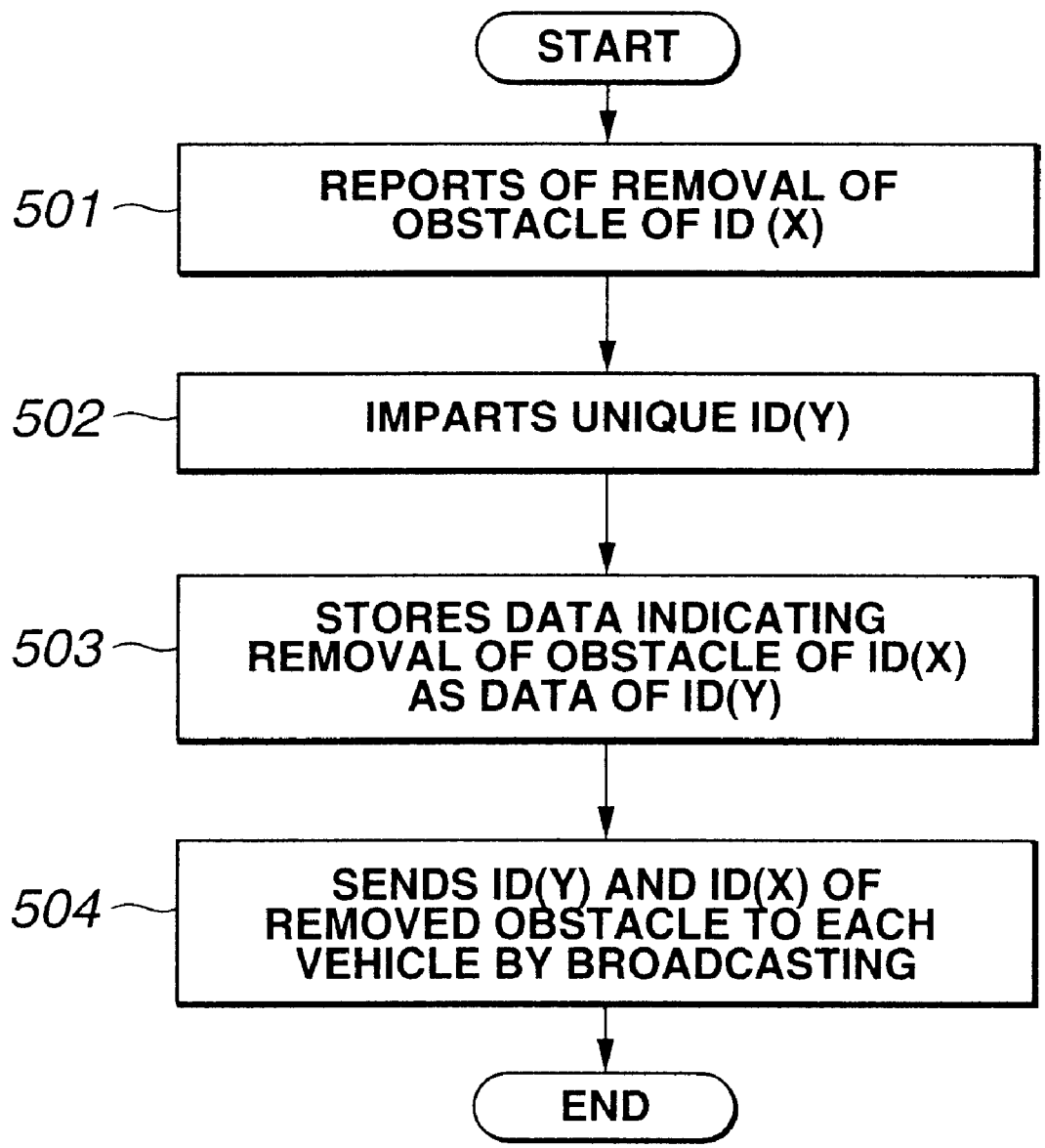
FIG. 11 is a flowchart showing a processing operation of the monitor station of the second embodiment.

As shown in FIG. 10, the monitor station 20 is reported the obstacle data indicating a new obstacle (obstacle location, shape and approximate weight) from the vehicle (step 401), gives unique ID to the obstacle data and stores data about the obstacle, namely the obstacle data (obstacle location, shape and approximate weight) as data of the above ID (step 402). Then, the monitor station 20 transmits the obstacle data and ID to the respective vehicles by broadcasting (step 403) and broadcasts the latest ID and data indicating approximate location to the respective vehicles every 30 seconds (step 404).

Processing by the monitor station 20 when the obstacle is removed will be described with reference to the flowchart shown in FIG. 11.

Here, for convenience of description, ID given to the obstacle to be removed is determined as ID(X).

The monitor station 20 is reported that the obstacle indicated by ID(X) was removed (step 501). The monitor station 20 gives unique ID (ID(Y) for convenience of description) to the reported content (step 502) and also stores data indicating that the obstacle indicated by ID(X) was removed as data of ID(Y) (step 503), and then transmits ID(Y) and ID(X) of the removed obstacle and the effect that the obstacle was removed to the respective vehicles by broadcasting (step 504).

Now, the processing operation by the each vehicle will be described with reference to FIG. 12 to FIG. 14.

Figure 12:
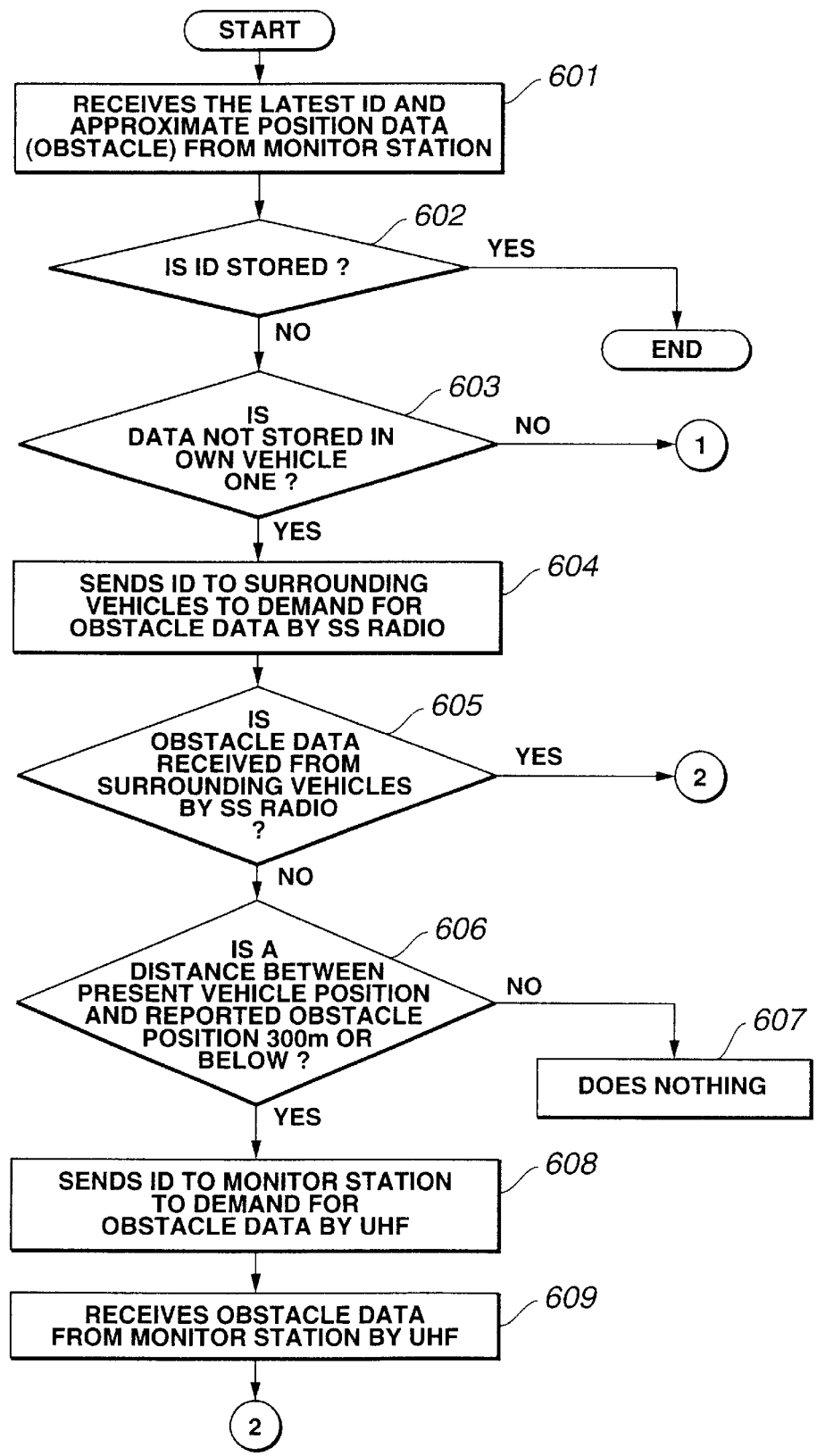
FIG. 12 is a flowchart showing a processing operation of each vehicle of the second embodiment.

As shown in FIG. 12, the each vehicle receives the latest ID and data indicating an approximate position (obstacle data) from the monitor station 20 (step 601), judges whether it has the latest ID therein (step 602), and if not, judges whether the number of data not stored therein is one or not (step 603).

Figure 14:
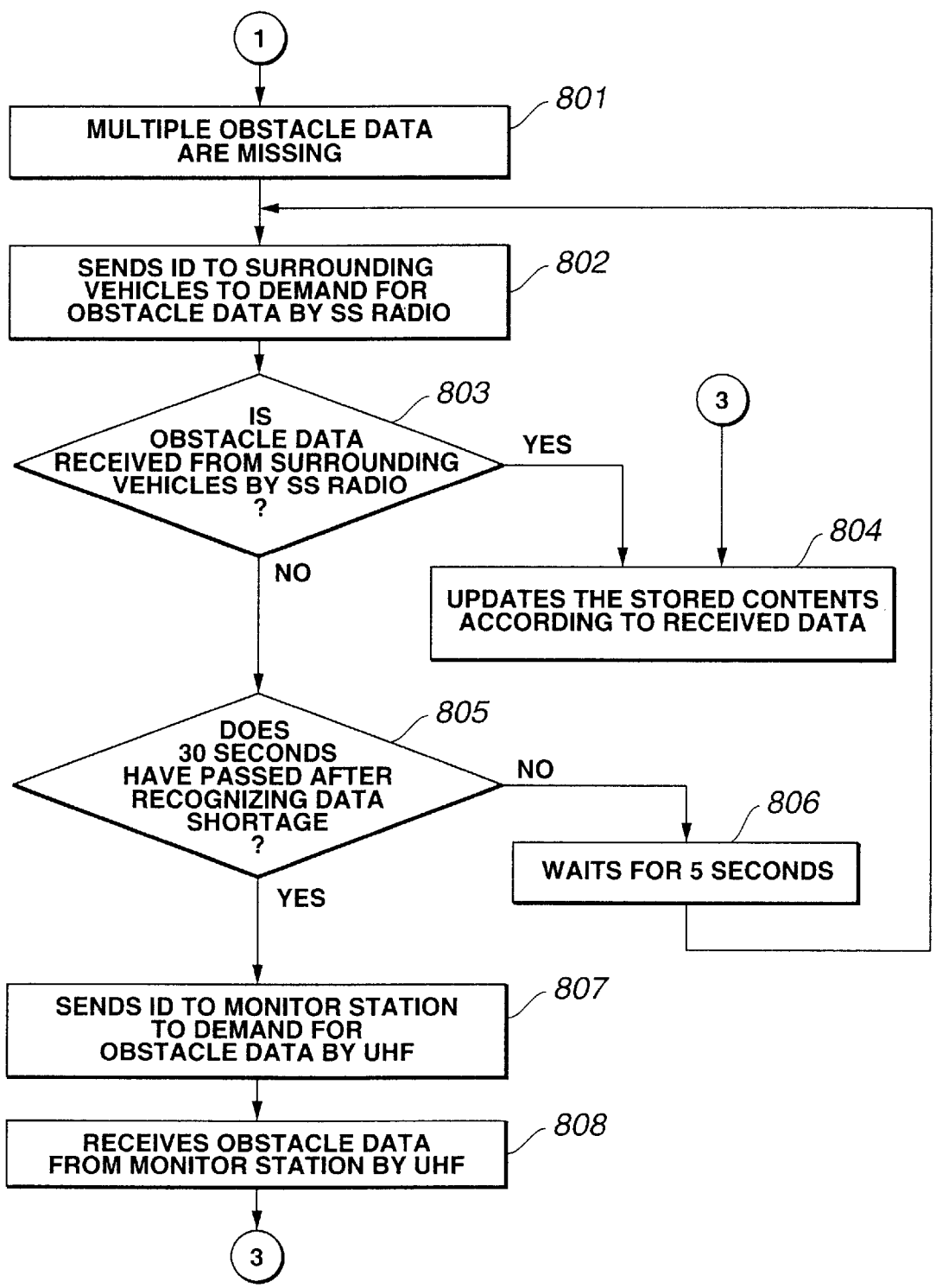
FIG. 14 is a flowchart showing a processing operation of each vehicle of the second embodiment.

In step 603, when the number of data not stored is two or more, the each vehicle performs the processing indicated in FIG. 14 to be described afterward. And, when it is one, the latest ID received in step 12 is transmitted to the surrounding vehicles by the SS radio communication to demand for the obstacle data (step 604), and it is judged whether the obstacle data is received from the surrounding vehicles having responded to the demand by the SS radio communication (step 605).

Here, in the vehicle having the latest ID and the obstacle data, the obstacle data includes either actual obstacle data or data indicating that the obstacle is deleted.

Figure 13:
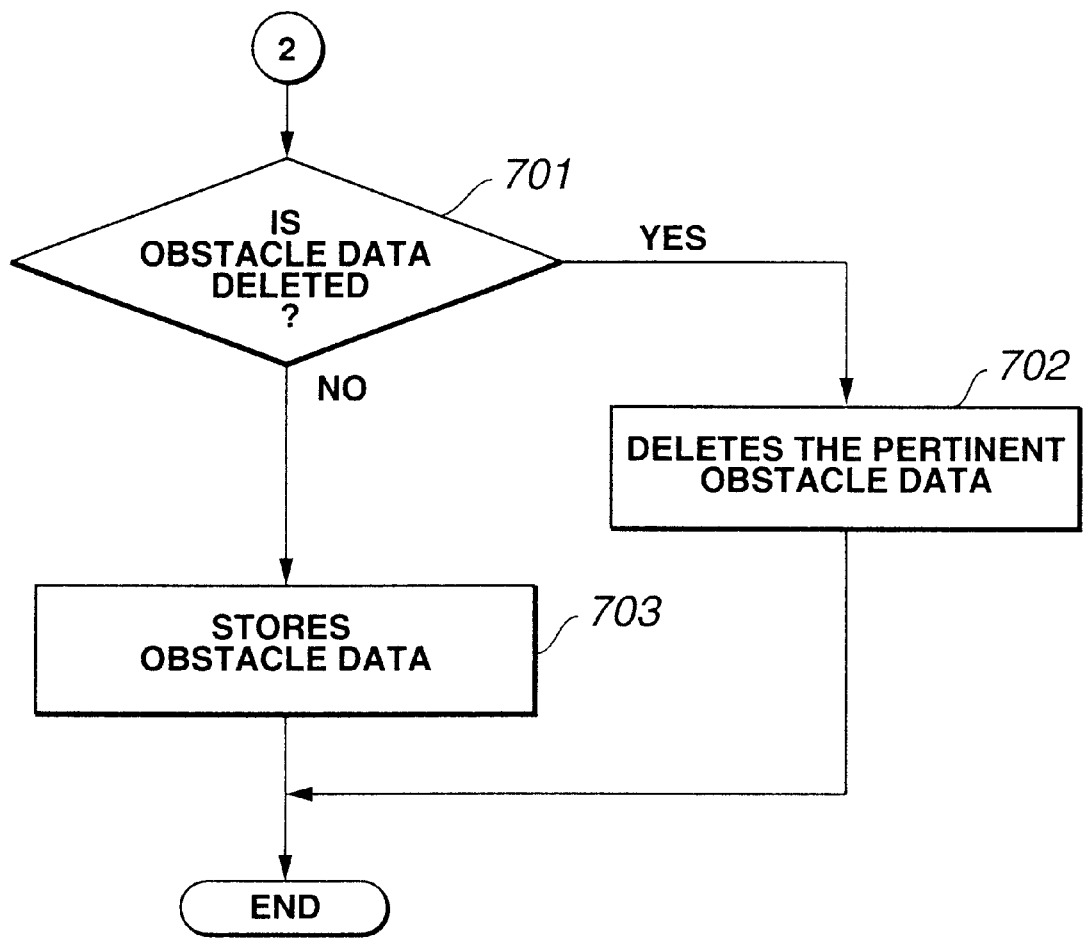
FIG. 13 is a flowchart showing a processing operation of each vehicle of the second embodiment.

When the obstacle data is received in step 605, the each vehicle judges according to the received obstacle data that the obstacle data is deleted or not as shown in FIG. 13 (step 701), deletes the pertinent obstacle data when the data indicates that the obstacle is deleted (step 702) and stores the pertinent obstacle data when the data is the actual obstacle data (step 703).

When the obstacle data is not received from the surrounding vehicles in step 605 as shown in FIG. 12, the each vehicle judges whether a distance between its present location and the location of the obstacle is for example 300 m or below (step 606) and when it is more than 300 m, takes no action (step 607).

When the distance exceeds 300 m in step 606, the each vehicle transmits the latest ID received in step 601 to the monitor station 20 by UHF to demand for the obstacle data (step 608), receives the obstacle data from the monitor station 20 responding to the demand (step 609). Then, the process shifts to step 701 shown in FIG. 13.

When the number of data not stored in the own vehicle is 2 or more in step 603, the each vehicle judges that a plurality of obstacle data are missing (step 801). This situation occurs when the power of the vehicle is off or just turned on and could not receive the data even if the latest ID and the obstacle data are broadcast from the monitor station 20.

When it is judged that a plurality of obstacle data are missing in step 801, the each vehicle sends the latest ID to the surrounding vehicles by the SS radio communication to demand for the obstacle data (step 802), and judges whether the obstacle data is received from the surrounding vehicles having responded to the demand by the SS radio communication (step 803).

When the obstacle data is received in step 803, the each vehicle updates the storage contents according to the received data (step 804), and when the obstacle data is not received, it is checked that the number of data is short (namely, it is judged NO in step 603), and judged whether it has passed e.g., 30 seconds (step 805).

When it has not passed 30 seconds in step 805, each vehicle waits for five seconds for example (step 806). Then, the process proceeds to step 802. On the other hand, when it has passed 30 seconds, the latest ID is transmitted to the monitor station 20 by UHF to demand for the obstacle data (step 807), the obstacle data is received from the monitor station 20 by UHF (step 808), and the process moves to step 804.

As described above, according to the second embodiment, the obstacle data (common data) is shared among the plurality of vehicles, so that the operators can recognize the existence of the obstacle without actually seeing the obstacle and can control to avoid it according to the obstacle data.

And, by sharing the obstacle data (common data) indicating data that the obstacle was removed among the plurality of vehicles, the operator can know that the obstacle was removed even if the operator is far away from the location where the obstacle was and does not know visually that the obstacle was removed.

Third Embodiment

The same vehicle monitor system as described in the first embodiment is considered in the third embodiment. Basically, the radio communication system of this vehicle communication system has the same structure as shown in FIG. 2, the equipment and devices mounted on an unmanned vehicle have the same structure as shown in FIG. 3, and the equipment and devices mounted on a manned vehicle have the same structure as shown in FIG. 4.

The third embodiment is directed to a system which shares data among a plurality of vehicles which exist in a distance (area) that data can be transmitted or received by the SS radio communications only without performing the UHF communications. The vehicles here are manned vehicles.

Figure 15:
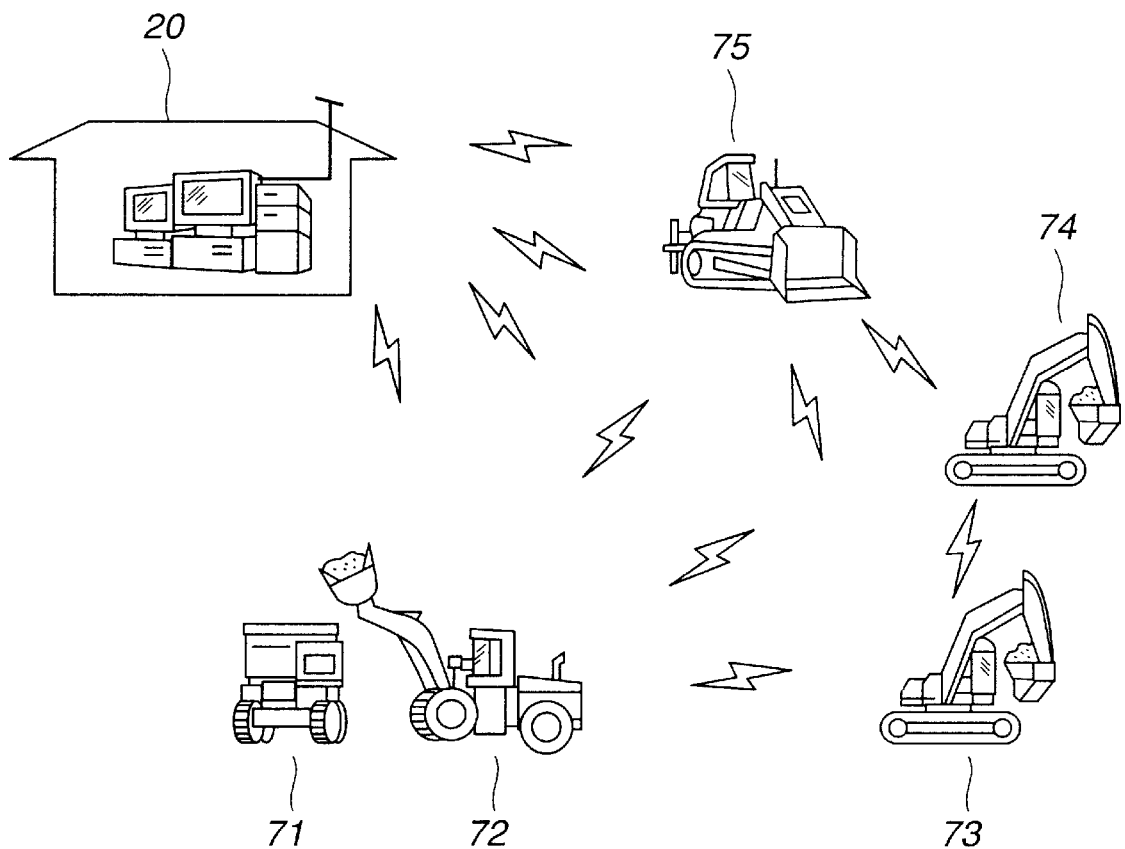
FIG. 15 is a diagram showing a general view of a system according to a third embodiment.

FIG. 15 is a diagram showing a general view of the system considered in the third embodiment. The system shown in FIG. 15 comprises the monitor station 20 shown in FIG. 1 and a plurality of vehicles (manned construction machines) 71 to 75 having the same functions as the vehicles 10 to 13 shown in FIG. 1.

But, the following items are different from the first embodiment.

The monitor station 20 stores target landform data and present landform data. The present landform data is variable with the progress of the work by the construction machines, and the target landform data is also updated whenever necessary according to the progress of the work.

The construction machines 71 to 75 measure their positions and directions by a position measuring equipment (e.g., position measuring equipment 51) mounted on the bodies of the construction machines.

The construction machines 71 to 75 are provided with an angle sensor and an inclination angle sensor for each link of the hydraulically driven work machines to measure the positions and directions of the bucket and blade by these sensors. The display screen of the display device 52 shows the target landform data, the present landform data and the location of the work machine, and the operator is supported the progress of work as the contents of such data are shown on the screen. In other words, the target landform can be obtained by operating the bucket and the blade in compliance with the target landform data.

In this embodiment, the target landform data and the work progress degree by the other vehicles are stored as common data in the each vehicle. The each vehicle transmits data indicating the landform through the work to the other vehicles every fixed time (for instance, five minutes) through the vehicle-to-vehicle communication equipment 6. Referring to the contents shown on the screen of the display device 52 mounted near the driver seat, the each vehicle can know the progress of the entire construction.

The each vehicle determines the location of the work machine such as the bucket sequentially, adds data indicating the shape of the bucket three-dimensionally by using CSG (Constructive Solid Geometry) method (namely, a three-dimensional CAD) to obtain data indicating the landform (portion) removed by excavation.

Namely, the position where the bucket has reached is the landform (portion) through the excavation, so that sequential "Boolean sum" of data showing the shape indicating a track of the bucket is determined, and a "landform removed by the excavation" can be determined by "Boolean product" of the "Boolean sum" with the initial landform".

Figure 16A:
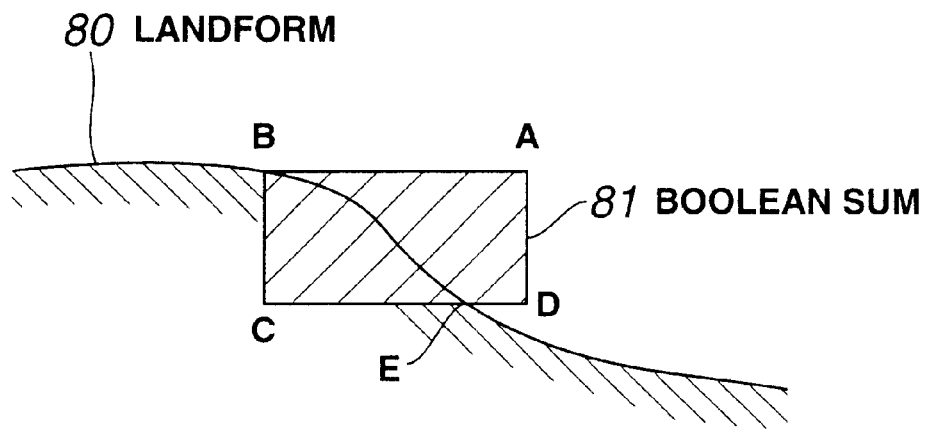
FIGS. 16(a) to 16(c) are diagrams for illustrating the contents of common data according to the third embodiment.
Figure 16B:
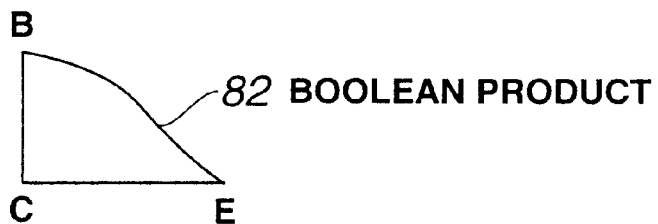
Figure 16C:
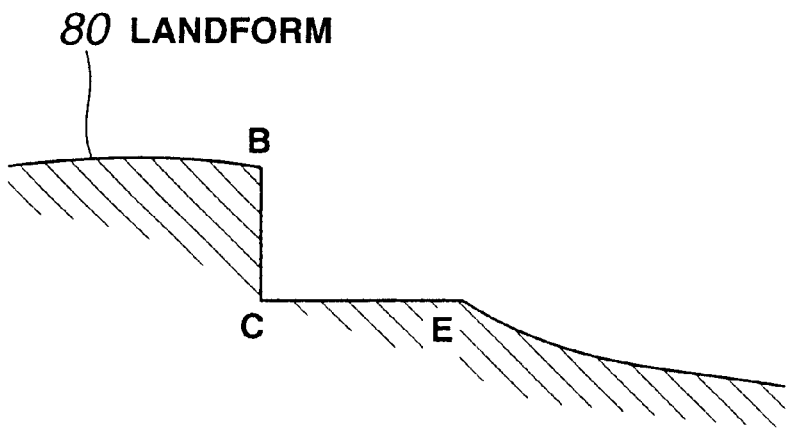

Specifically, as shown in FIG. 16(*a*), it is assumed that initial landform 80 is excavated, and a final shape indicating the track of the bucket is portion 81 indicated by a shaded section in the drawing. The portion 81 is an area formed by connecting respective points A, B, C, D and E as seen in the drawing. Points B, E are points of intersection of the landform 81 and the shape indicating the track of the bucket. Here, data indicating the portion 81 is assumed to be "Boolean sum". The "Boolean product" of the Boolean sum with the data indicating the landform 81 is a "landform portion removed by the excavation" as shown in FIG. 6(*b*).

A "Boolean difference" between the "Boolean sum" (portion 81) and the landform 80 becomes the landform 81 after the excavation as shown in FIG. 16(*c*).

Here, when it is assumed that a landform removed by the excavation at a given time is BPt, a landform removed by the each vehicle in a predetermined period (e.g., one day) is RMn, and an initial landform is IS, "RMn" can be determined by the "Boolean product" of a "total of BPt at a given time in a predetermined period" with "IS".

This is indicated by an expression as follows:

$$RMn = IS \times (\Sigma BPt)$$

Now, the content of the processing of this embodiment will be described.

A vehicle (vehicle A) gives identification information (ID) to data indicating the "removed landform portion" (Boolean sum) every predetermined period T1 (e.g., five minutes), broadcasts data indicating the "removed landform portion" and ID to another vehicle (vehicle B) by the SS radio communication and also broadcasts the location data of the own vehicle and the latest ID every predetermined period T2 (e.g., five seconds) by the SS radio communications.

The vehicle B having received the latest ID transmitted every five seconds compares the received latest ID with the ID stored in the vehicle B, and when its stored ID (e.g., ID8) is older than the latest ID (ID10) (in this case, the larger the ID number is, the newer the ID number is), the stored content is updated to the latest ID (ID10), and the vehicle B demands the sender (the vehicle A in this case) by the SS radio transmission for data indicating the "landform portion removed by the excavation" corresponding to the latest ID.

The ID in this case is information which includes information for identifying the vehicle and time-series information (e.g., version information). Therefore, the other vehicle having received the ID can refer to this ID to know which vehicle has sent this data.

The reason of broadcasting the location of the own vehicle every five seconds is that it is required to avoid interference with another vehicle.

Besides, the latest ID is broadcast every five seconds, so that the vehicle which has failed to receive the data sent by broadcasting and actually needs the data can inquire to the vehicle which has broadcast the data.

The vehicle which actually needs the data is another vehicle which is located near the own vehicle and related to the own vehicle and a vehicle of someone involved in the work. The other vehicle located near the own vehicle and related to the own vehicle is used to means a relation between the vehicle (construction machine) 72 for loading excavation onto another vehicle such as a dump truck and a vehicle (construction machine) 71 on which the excavation is loaded in FIG. 15. In this case, the vehicle 71 can monitor the progress of the work by the vehicle 72 to predict a time when the work by the vehicle 72 is terminated.

For example, the vehicle 71 shown in FIG. 15 cannot receive data up to ID10 and its stored ID is for example ID8, the vehicle 71 can demand the vehicle 72 which is the sender for data indicating the "removed landform portion" corresponding to the latest ID10. Thus, the vehicle 71 can know the latest progress of the vehicle 72.

Subsequently, the communication between the vehicles will be described specifically with reference to FIG. 17.

It is assumed that data is transmitted and received between the vehicles by the SS radio communication.

Figure 17:
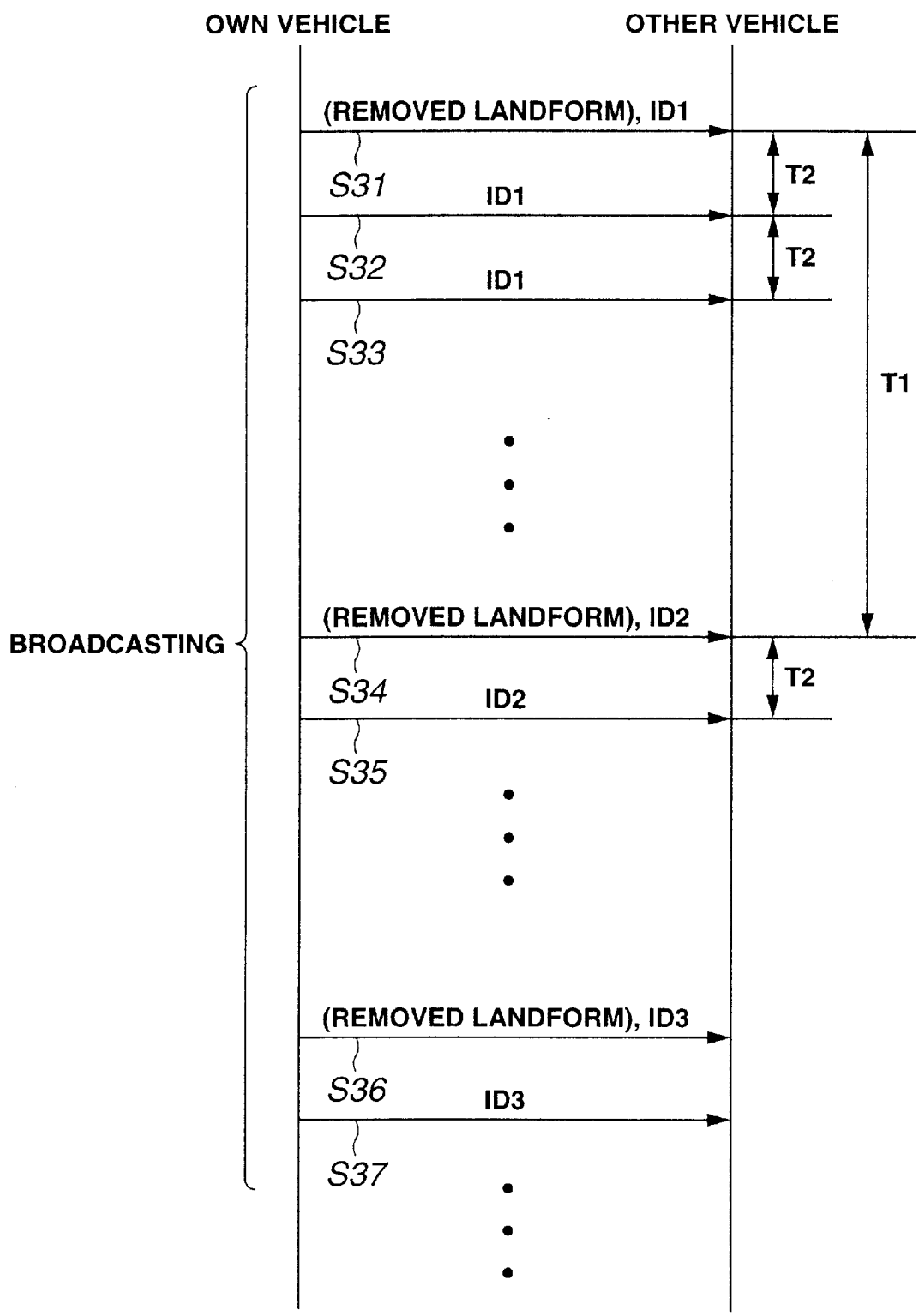
FIG. 17 is a sequence diagram showing a processing operation between vehicles according to the third embodiment.

As shown in FIG. 17, the own vehicle (vehicle A) broadcasts data indicating the "removed landform portion" and ID, e.g., ID1, given to the data to another vehicle (vehicle B) (S31). Then, the vehicle A broadcasts its position data and ID1 only to the vehicle B every predetermined time T2 (five seconds) (S32, S33).

Similarly, after transmitting the data indicating the "removed landform portion" of ID1, data indicating another "removed landform portion" and ID2 given to the data are broadcast to the vehicle B after the lapse of predetermined period T1 (e.g., five seconds) (S34). After broadcasting such data, the vehicle location data and the latest ID, namely ID2, are broadcast every predetermined time T2 (five seconds) (S35).

Similarly, after the expiration of a predetermined time T1 after transmitting data indicating the "removed landform portion" indicated by ID2, data indicating a new "removed landform" and ID, e.g., ID3, given to the data are broadcast to the vehicle B (S36), and the position data of the vehicle A and the latest ID3 are broadcast to the vehicle B every predetermined time T2 (S37).

And, when the vehicle B can receive the data indicating the "removed landform portion", the vehicle B updates its data indicating the progress of the work by the respective vehicles by using the received data. In other words, the "Boolean sum" of the "removed landform portion" broadcast by the each vehicle is also determined, and the "landform removed by each vehicle today=the progress of the work" is determined from the "Boolean product" of the "Boolean sum" with data indicating the "initial landform".

And, by using such data, the progress of the work by each vehicle, a ratio of non-working vehicles, time and others can also be controlled.

As described above, data can be shared among the plurality of vehicles by using the SS radio communications only according to the third embodiment. Besides, the latest data can be demanded to the sender of the data according to the result obtained by comparing the broadcast latest ID with the ID stored in the vehicle.

What is claimed is:

1. Data sharing equipment for mobile stations, comprising a plurality of mobile stations moving along runways and a monitor station for monitoring the plurality of mobile stations, wherein:

the plurality of mobile stations and the monitor station are provided with communication means for transmitting and receiving data to and from other stations;

the mobile stations are provided with storage means for storing data transmitted from other stations, and the monitor station or at least one of the plurality of mobile stations are provided with imparting means for giving identification information to predetermined data for identifying the predetermined data;

predetermined instructions are given to the mobile station with identification information given by the imparting means; and the mobile station instructed by the identification information, when data corresponding to the identification information is not stored in its storage means, transmits a demand for transmission of data corresponding to the identification information to the monitor station or other mobile station through the communication means.

2. The data sharing equipment for mobile stations according to claim 1, wherein:

the monitor station is provided with data storage means for storing data as a reference and identification information imparting means for giving identification information for identifying data to the data stored in the data storage means, and transmits the data stored in the data storage means and the identification information given to the data to the plurality of mobile stations by broadcasting;

the monitor station or any one of the plurality of mobile stations transmits predetermined instructions to other stations by the identification information; and the mobile station instructed by the identification information, when data corresponding to the instructed identification information is not stored in the own storage means, transmits a demand for transmission of data corresponding to the identification information to the monitor station or other mobile stations.

3. The data sharing equipment for mobile stations according to claim 2, wherein each of the plurality of mobile stations comprises first communication means for transmitting and receiving data with other mobile stations and second communication means for transmitting and receiving data with the monitor station.

4. The data sharing equipment for mobile stations according to claim 1, wherein:

the monitor station is provided with data storage means for storing data as a reference and identification information imparting means for giving identification information for identifying data to the data stored in the data storage means, and transmits latest identification information imparting means to the plurality of mobile stations by periodically broadcasting through the communication means; and when the latest data corresponding to the latest identification information from the monitor station is not stored in the storage means and judges that the latest data is required, the mobile station transmits a demand for transmission of the latest data to the monitor station or other mobile stations through the communication means.

5. The data sharing equipment for mobile stations according to claim 4, wherein each of the plurality of mobile stations comprises first communication means for transmitting and receiving data with other mobile stations and second communication means for transmitting and receiving data with the monitor station.

6. The data sharing equipment for mobile stations according to claim 1, wherein each of the plurality of mobile stations comprises first communication means for transmitting and receiving data with other mobile stations and second communication means for transmitting and receiving data with the monitor station.

7. Data sharing equipment for mobile stations, comprising:

a plurality of unmanned dump trucks that run according to instructed courses;

a loading machine for loading the unmanned dump trucks, wherein:

the loading machine generates new course data each time a loading position at a loading spot is changed and transmits the new course data to a monitoring station;

after receiving the new course data, the monitoring station imparts new identification information for identifying the new course data, and the monitoring station transmits the new course data with the new identification information to the plurality of unmanned dump trucks;

when an unmanned dump truck of the plurality of unmanned dump trucks enters the loading spot, the monitor station transmits the new identification information, and the unmanned dump truck runs in accordance with the new course data corresponding to the new identification information.

* * * * *